(12) United States Patent
Fukuda (10) Patent No.: US 6,869,310 B2
(45) Date of Patent: Mar. 22, 2005

(54) BATTERY CONNECTOR

(75) Inventor: Eiji Fukuda, Shizuoka-ken (JP)

(73) Assignee: Yazaki Corporation, Tokyo (JP)

( * ) Notice: Subject to any disclaimer, the term of this patent is extended or adjusted under 35 U.S.C. 154(b) by 117 days.

(21) Appl. No.: 10/260,388

(22) Filed: Oct. 1, 2002

(65) Prior Publication Data

US 2003/0064634 A1 Apr. 3, 2003

(30) Foreign Application Priority Data

Oct. 2, 2001 (JP) .................................. P 2001-306233

(51) Int. Cl.$^7$ ............................................. H01R 13/52
(52) U.S. Cl. ...................................... 439/522; 439/761
(58) Field of Search ............................... 439/522, 761, 439/762, 773, 774, 772

(56) References Cited

U.S. PATENT DOCUMENTS

| | | | | |
|---|---|---|---|---|
| 3,568,139 A | * | 3/1971 | Delzer | 439/759 |
| 4,564,569 A | * | 1/1986 | Pechal | 429/121 |
| 5,111,130 A | | 5/1992 | Bates | 439/5 |
| 5,269,709 A | | 12/1993 | Eriksson | 439/5 |

FOREIGN PATENT DOCUMENTS

| | | |
|---|---|---|
| EP | 0 466 528 A1 | 1/1992 |
| JP | 6-60053 | 8/1994 |
| JP | 9-7579 | 1/1997 |
| JP | 10-223200 | 8/1998 |

OTHER PUBLICATIONS

Great Britain Search Report

* cited by examiner

Primary Examiner—Phuong Dinh
(74) Attorney, Agent, or Firm—Finnegan, Henderson, Farabow, Garrett & Dunner, L.L.P.

(57) ABSTRACT

A battery connector is constituted by a battery terminal, a fitting portion, a terminal cover, an opening portion and an operation member. The battery terminal is connected to a wire and has the fitting portion which has an aperture enough to be loosely fitted to the battery post. The terminal cover receives the battery terminal therein and has the opening portion for the battery terminal to fit to the battery post therethrough. The operation member is movably attached to the terminal cover, and fastens the battery terminal to the battery post by reducing the aperture of the fitting portion loosely fitted to the battery post. Therefore, the battery connector is pressure-fixed to the battery post.

8 Claims, 10 Drawing Sheets

BATTERY CONNECTOR

CROSS REFERENCE TO RELATED APPLICATION

This application claims benefit of priority under 35 U.S.C. §119 to Japanese Patent Application No. 2001-306233, filed on Oct. 2, 2001, the entire contents of which are incorporated by reference herein.

BACKGROUND OF THE INVENTION

1. Field of the Invention

The present invention relates to a battery connector for connecting a wire to an electrode of a battery mounted to an automobile.

2. Description of the Related Art

Figure 1:
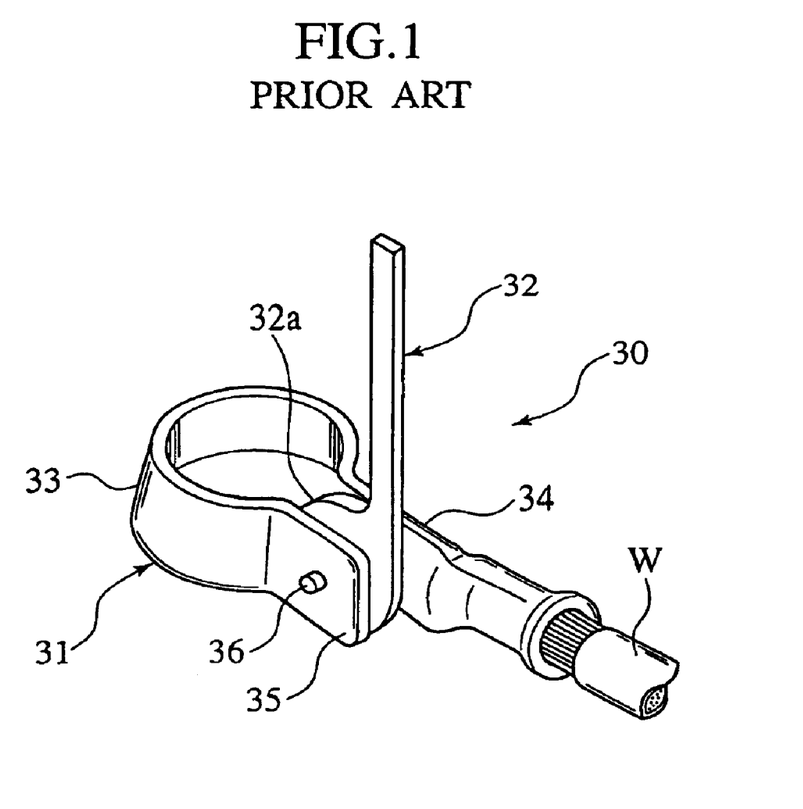
FIG. 1 is a perspective view showing one example of a conventional battery terminal.
Figure 2A:
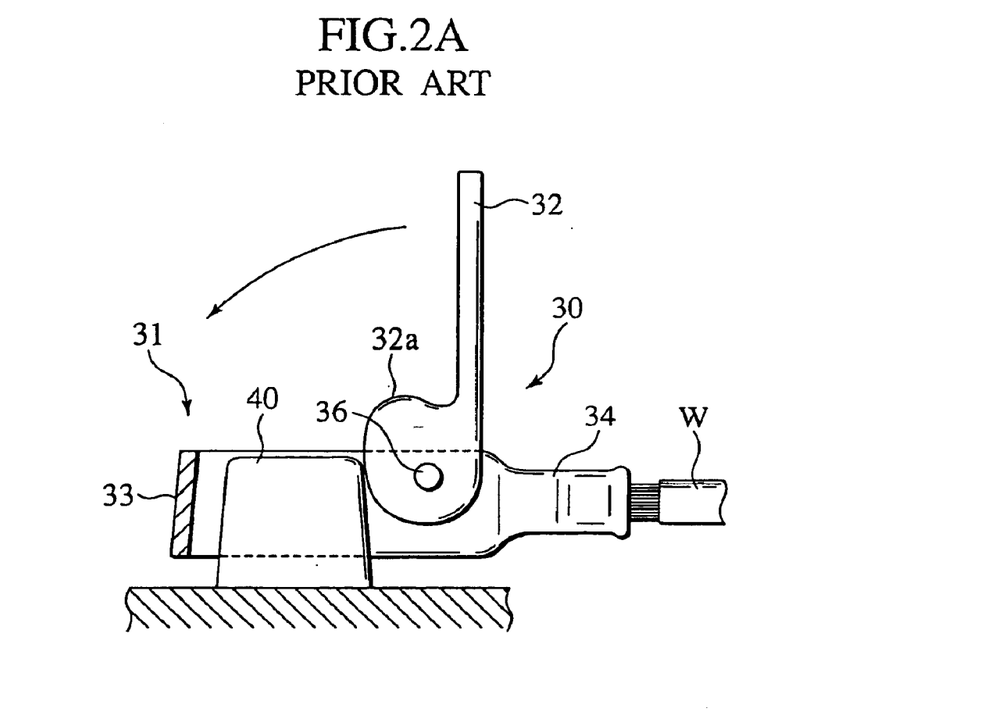
FIG. 2A is a side sectional view showing a state where the battery terminal shown in FIG. 1 has been simply set to a battery post.
Figure 2B:
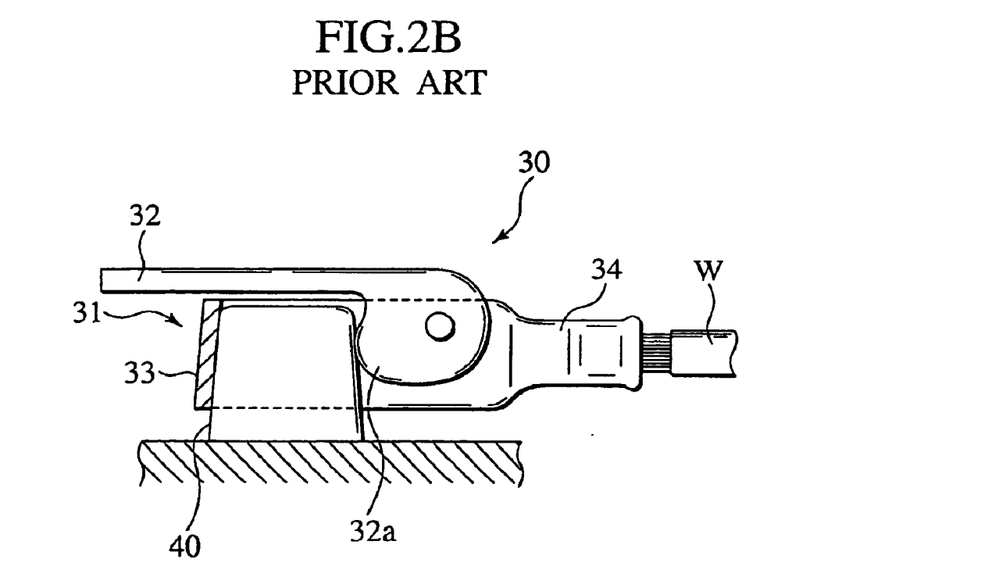
FIG. 2B is a side sectional view showing a state where the battery terminal shown in FIG. 1 has been pressure-fixed to the battery post by pushing down a lever.

FIGS. 1, 2A and 2B show a conventional battery terminal described in JU-A06-60053. A battery terminal 30 has a cam lever (an operation lever) 32 is pivotally mounted to a terminal main body 31. As shown in FIG. 1, the terminal main body 31 includes a fitting portion 33 formed so as to be bent in a C-annular shape, and a pair of folded pieces 34, 35 extending from both ends of the fitting portion 33 in parallel with each other. A pivoting shaft 36 is mounted to the pair of folded pieces 34, 35. The cam lever 32 is pivotably supported by the pivoting shaft 36. Then, a wire W is connected to one folded piece 34.

With reference to FIG. 2A and FIG. 2B, an operation of the battery terminal 30 will be explained. As shown in FIG. 2A, when the cam lever 32 is caused to stand, a cam portion 32a stands correspondingly. Therefore, the fitting portion 33 has a large aperture. As a result, the fitting portion 33 is loosely fitted to a battery post 40.

After the fitting portion 33 is loosely fitted to the battery post 40, as shown in FIG. 2B, the cam portion 32a presses an outer peripheral face of the battery post 40 by falling down the cam lever 32. At this time, an inner peripheral face of the fitting portion 33 is pressure-fixed to an outer peripheral face of the battery post 40 due to a reaction force generated by pressing of the can portion 32a. As a result, the battery terminal 30 is electrically and mechanically connected to the battery post 40 by a friction force between the inner peripheral face of the fitting portion 33 and the outer peripheral face of the battery post 40.

However, since the above-described battery terminal 30 has an exposed metal portion, such as the cam lever 32, there is a risk that an operator may receive an electric shock at a time of detaching/attaching the fitting portion 33 from/to the battery post 40.

SUMMARY OF THE INVENTION

The present invention has been proposed in view of the above-described circumstances, and it is an object of the present invention to provide a battery connector which has a high safety and where there is not a risk that an operator receives an electric shock.

In order to achieve the above-described object, the present invention provides a battery connector for connecting a wire to a battery post, comprising: a battery terminal having a fitting portion which has an aperture enough to be loosely fitted to the battery post and which is pressure-fixed to the battery post by reducing the aperture; a terminal cover receiving the battery terminal therein and having an opening portion for the battery terminal to fit to the battery post therethrough; and an operation member attached to the terminal cover and fastening the battery terminal to the battery post by reducing the aperture of the fitting portion loosely fitted to the battery post.

According to the present invention, in the state where the battery terminal is received in the terminal cover, the fitting portion of the battery terminal is pressure-fixed to the battery post by the operation member attached to the terminal cover. Accordingly, since an exposure portion of a metal is concealed by the terminal cover except for a portion of the metal which is required to be exposed, there is no risk that an operator receives an electric shock, when the operator connects the wire to the battery post by means of the battery connector. Therefore, safety of the battery connector can be improved.

In a preferred embodiment of the invention, the terminal cover and the operation member are made of insulation resin.

According to this embodiment, since the terminal cover and the operation member are made of insulation resin, there is not an exposed metal portion in the terminal cover and the operation member. Therefore, safety of the battery connector can be improved.

In a preferred embodiment of the invention, the operation member is pivotably attached to the terminal cover and has a pressing portion which reduces the aperture of the fitting portion as the operation member is pivotably operated.

According to this embodiment, since the operation member is pivotably attached to the terminal cover, the fitting portion received in the terminal cover can easily be pressure-fixed to the battery post by only pivoting the operation member. Therefore, an operability of the battery connector is improved.

In a preferred embodiment of the invention, the pressing portion comprises: an inclining portion which is inclined with respect to a pivoting face of the operation member and which gradually reduces the aperture of the fitting portion as the operation member is pivotably operated in a first half of a pivoting operation; and a parallel portion which is contiguous to the inclining portion and is arranged in parallel with respect to the pivoting face of the operation member and which stably maintains the reduced aperture of the fitting portion as the operation member is pivotably operated in a second half of the pivoting operation.

According to this embodiment, since, in the first half of the pivoting operation, a force for pivoting the operation member is converted to a force for reducing the aperture of the fitting portion by the inclining portion, a returning rotation force acts on the operation member due to an elastic reaction force occurring in an expanding direction of the aperture while the operation member is being pivoted. However, in the second half of the pivoting operation, the parallel portion arranged in parallel with respect to the pivoting face of the operation member presses the fitting portion and the returning rotation force is canceled by the parallel portion. Therefore, a state where the aperture of the fitting portion has been reduced (a state where the fitting portion has been pressure-fixed to the battery post) can be maintained stably. As a result, the operation member can stably be maintained at the fastening position where the aperture has been reduced, without using lock means to lock the operation member at the fastening position.

In a preferred embodiment of the invention, the operation member is slidably attached to the terminal cover and has a pressing portion to reduce the aperture as the operation member is slidably operated.

According to this embodiment, since the operation member is slidably attached to the terminal cover, the fitting portion can easily be pressure-fixed on the battery post received in the terminal cover by only sliding the operation member. Therefore, an operability of the battery connector is improved.

In a preferred embodiment of the invention, the pressing portion comprises an upper protrusion and a lower protrusion, and the terminal cover comprises an upper hole and a lower hole.

According to this embodiment, since two protrusions are provided with the operation member and two holes are provided in the terminal cover, the operation member is engaged with the terminal cover without using new engaging tools.

In a preferred embodiment of the invention, the lower protrusion is fitted into the upper hole to temporarily engage the operation member with the terminal cover in a first half of a sliding operation, and the lower protrusion and the upper protrusion are fitted into the lower hole and the upper hole respectively to regularly engage the operation member with the terminal cover in a second half of the sliding operation.

According to the embodiment, since, in the first half of the sliding operation, the operation member is temporarily engaged with the terminal cover, the operation member can be prevented from falling off. Also, since, in the second half of the sliding operation, the operation member is regularly engaged with the terminal cover, the operation member can be firmly fixed to the terminal cover and a state where the fitting portion has been pressure-fixed to the battery post can be maintained stably.

In a preferred embodiment of the invention, the operation member serves as a lid body for terminal cover and completely closes an upper opening of the terminal cover in a state where the operation member has been engaged with the terminal cover.

According to this embodiment, since the operation member serves as a lid body for the terminal cover, it is not necessary to use new members for completely closing the terminal cover.

DESCRIPTION OF THE PREFERRED EMBODIMENTS

Two embodiments of a battery connector according to the present invention will be explained below with reference to the drawings.

Figure 3:
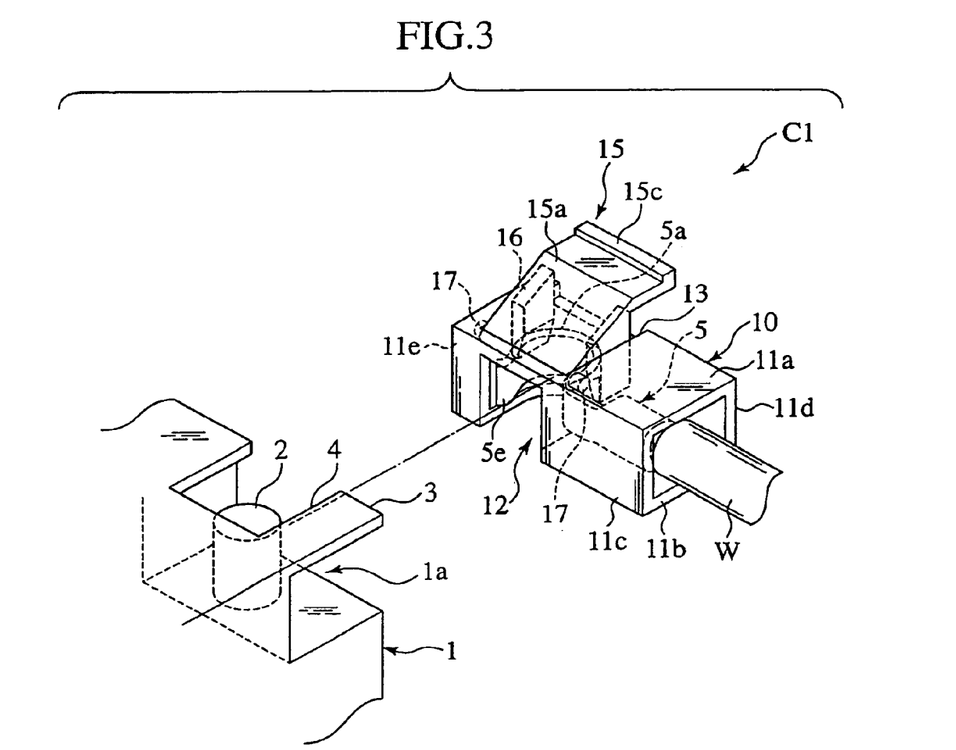
FIG. 3 is a configuration view according to a first embodiment of the present invention and a perspective view showing a state of the embodiment prior to attaching a battery connector to a battery post.
Figure 5A:
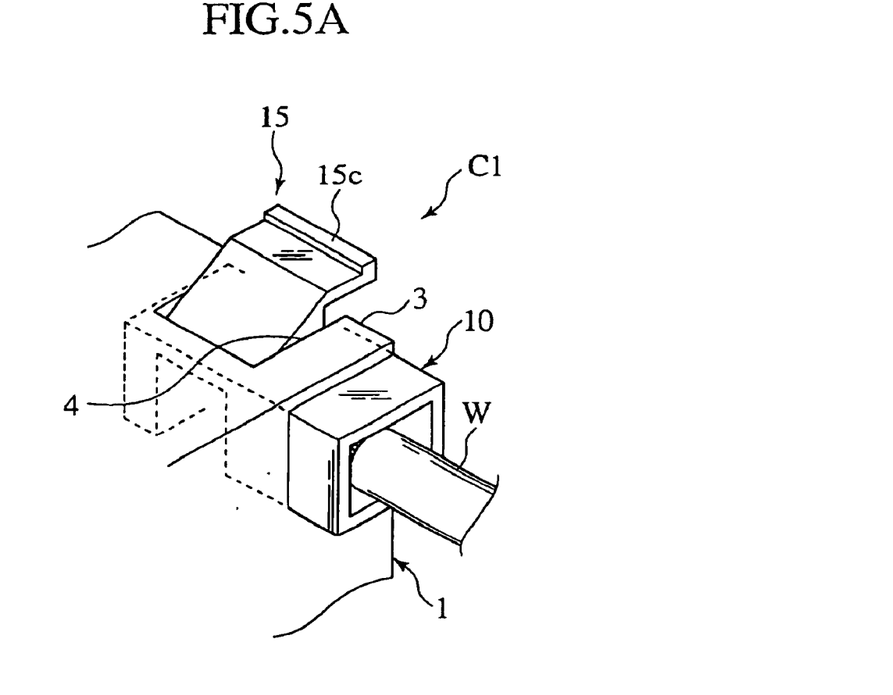
FIGS. 5A and 5B are views showing states where the battery connector according to the first embodiment of the present invention has been set to the battery post, FIG. 5A being a perspective view showing a state where the operation member is positioned at an initial position and FIG. 5B being a perspective view showing a state where the operation member has been pressed down to a fastening position.
Figure 5B:
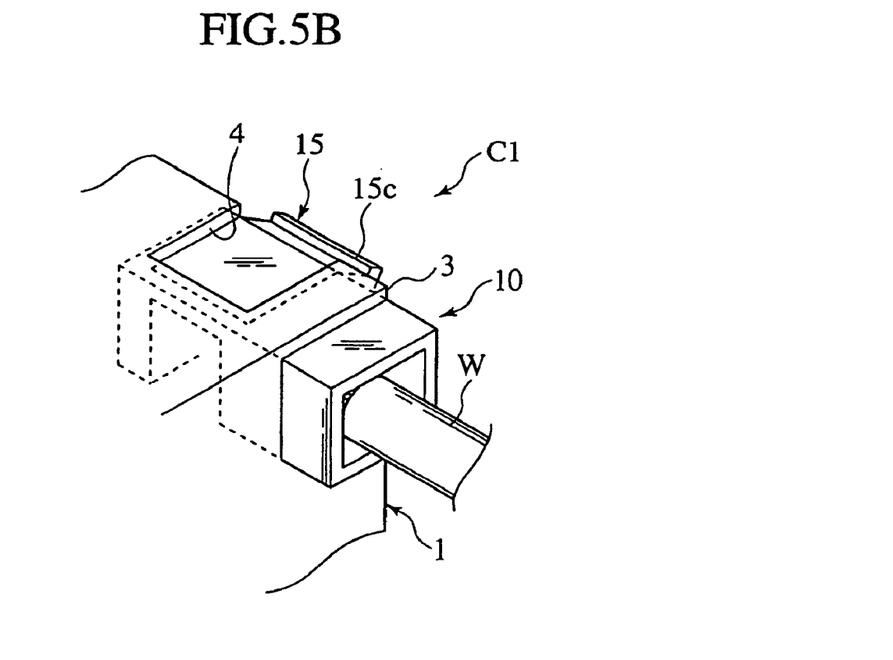
Figure 6A:
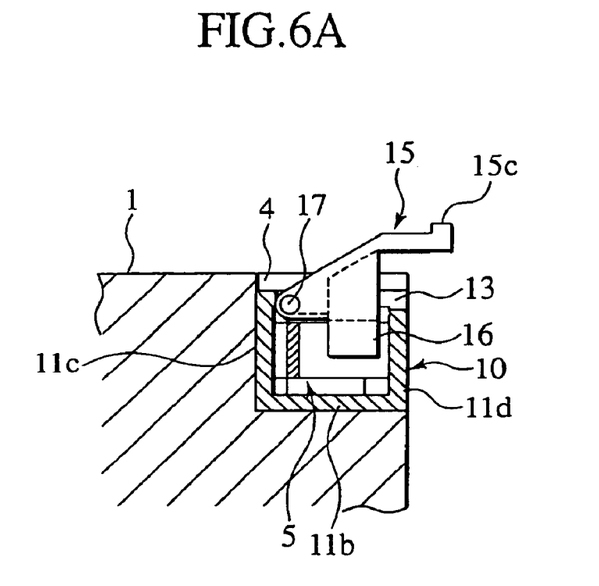
FIGS. 6A and 6B are vertical sectional views corresponding to FIGS. 5A and 5B, respectively.
Figure 6B:
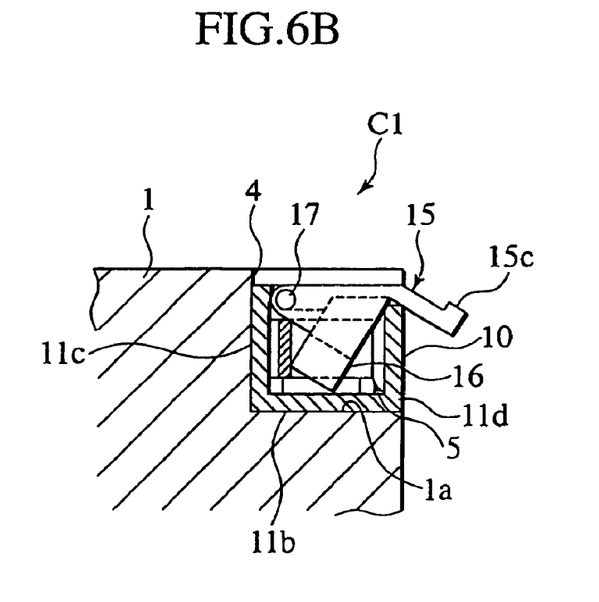
Figure 7A:
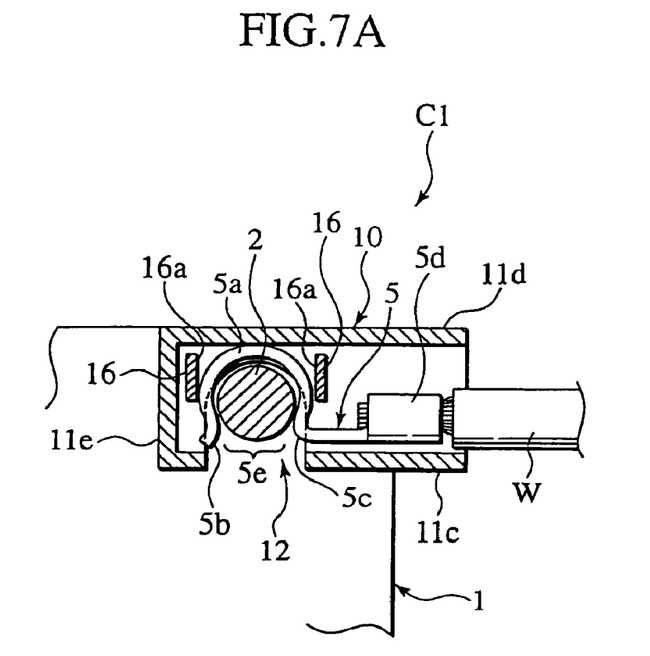
FIGS. 7A and 7B are horizontal sectional views corresponding to FIGS. 5A and 5B, respectively.
Figure 7B:
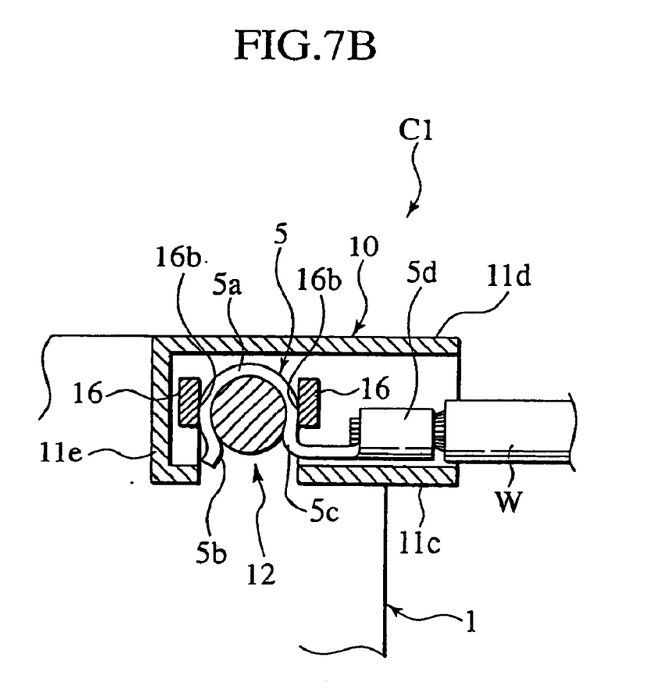

FIG. 3 to FIG. 7B shows explanatory views of a battery connector C1 according to a first embodiment. FIG. 3 is a perspective view showing a state prior to attaching the battery connector C1 to a battery post 2. FIGS. 4A, 4B and 4C are detailed views showing a constitution of an operation member 15 used in the battery connector C1. FIG. 5A is a perspective view showing a state where the battery connector C1 has been attached to the battery post 2. FIG. 5B is a perspective view showing a state where the battery connector has been fastened to the battery post by pressing down the operation member in a state where the battery connector C1 has been attached to the battery post 2. FIGS. 6A and 6B are vertical sectional views corresponding to FIGS. 5A and 5B, respectively. FIGS. 7A and 7B are horizontal sectional views corresponding to FIGS. 5A and 5B, respectively.

In FIG. 3, a rectangular recessed portion 1a in plan view is provided at a corner of a battery 1, and a battery post 2 is provided upward on a bottom face of the recessed portion 1a. Also, an upper wall 3 of the battery 1 is provided at an upper position spaced from the bottom face of the recessed portion 1a so as to extend in parallel with the bottom face of the recessed portion 1a, and a rectangular notch 4 is formed at only a portion of the extended upper wall 3 positioned above the battery post 2.

The battery connector C1 according to the first embodiment is connected at a distal end of a wire W. The battery connector C1 includes a battery terminal 5, a fitting portion 5a, a terminal cover 10, an opening portion 12 and an operation member 15. As shown in FIGS. 7A and 7B, the battery terminal 5 which is made of metal has the fitting portion 5a which is formed so as to have an aperture enough to be loosely fitted to the battery post 2 and which can be pressure-fixed to an outer peripheral face of the battery post 2 by reducing the aperture of the fitting portion 5a. As shown in FIG. 3, the terminal cover 10 which is made of insulation resin accommodates the battery terminal 5 and has the opening portion 12 for the battery terminal 5 to fit to the battery post 2. The operation member 15 which is made of insulation resin is pivotably attached to the terminal cover 10. Also, the aperture of the fitting portion 5a is reduced by pivoting the operation member 15 from an initial position to a fastening position, in a state where the fitting portion 5a is loosely fitted to the battery post 2. Thereby, the battery connector C1 is pressure-fixed on the battery post 2.

Next, constitutions of respective elements or members will be explained in detail. First, the constitution of the battery terminal 5 will be explained with reference to FIG. 3 and FIG. 7A. The fitting portion 5a is formed on the battery terminal 5 by bending a metal strip plate in a U shape. Also, an inlet 5e of a circular space to accommodate the battery post 2 is formed in the battery terminal 5 in a necking manner by necking a distal end 5b and a proximal end 5c of the U-shaped fitting portion 5a inwardly. Furthermore, a wire caulking portion 5d is provided on a strip plate extending at the proximal end 5c side. The battery terminal 5 is connected to a distal end of the wire W by caulking the wire caulking portion 5d to the distal end of the wire W.

Next, the constitution of the terminal cover 10 will be explained with reference to FIG. 3 and FIG. 7A. The terminal cover 10 takes a cylindrical shape with a rectangular cross section having an upper wall 11a, a lower wall 11b, a left side wall 11c, a right side wall 11d and a distal end wall 11e. Also, the terminal cover 10 has a structure where the battery terminal 5 connected to the distal end of the wire W can be inserted into the terminal cover 10 from a proximal end opening of the terminal cover 10. Here, for fitting the fitting portion 5a into the battery post 2 after the battery terminal 5 has been accommodated in the terminal cover 10, the opening portion 12 is provided at a portion of the left side wall 11c which is opposed to the inlet 5e of the fitting portion 5a. Also, for attaching the operation member 15 to the terminal cover 10, a mounting hole 13 is provided in the upper wall 11a positioned above the fitting portion 5a.

Next, the constitution of the operation member 15 will be explained with reference to FIGS. 4A, 4B and 4C. The operation member 15 has a top plate 15a corresponding to the size of the mounting hole 13, and triangular side plates 15b, 15b projecting downward from left and right side edges of the top plate 15a, respectively. Furthermore, pins 17, 17 serving as pivoting shafts are provided in a projecting manner at distal ends of the both side walls 15b, 15b, respectively. As shown in FIG. 3, the operation member 15 can be attached to the terminal cover 10 so as to be pivotable upward and downward by engaging the left and right pins 17, 17 in recesses (not shown) provided on the left and right walls (left and right sides as viewed from the right side wall 11d of the terminal cover 10) defining the mounting hole 13.

In this case, the left and right pins 17, 17 are respectively engaged with upper portions in the vicinity of the inlet 5e (refer to FIG. 7A) of the fitting portion 5a (portions of the left and right walls, defining the mounting hole 13, which are positioned near to the left side wall 11c of the terminal cover 10). The operation member 15 is attached to the terminal cover 10 such that the other end of the operation member 15, which is positioned on the right side wall 11d side and is not fixed, can be pivotable upward and downward using the left and right pins 17, 17 as fulcrums. Incidentally, an operation protrusion portion 15c is provided on an end portion of the top plate 15a such that the operation member 15 can easily be pressed down by a finger of an operator.

Figure 4A:
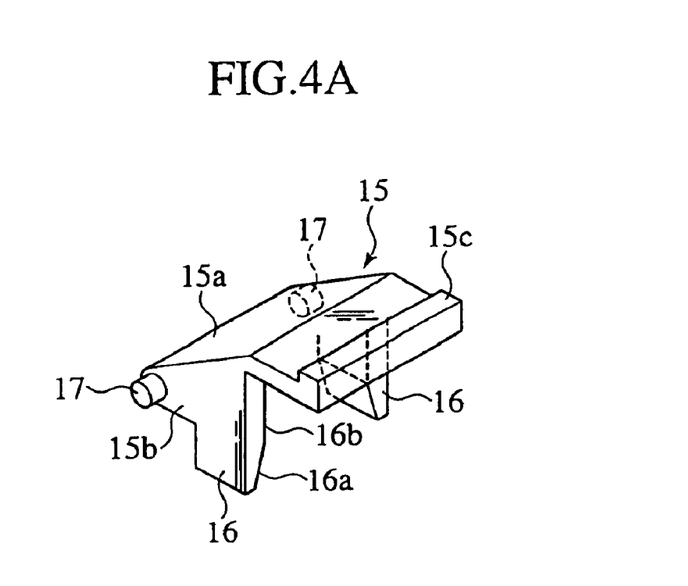
FIGS. 4A, 4B and 4C are configuration views of an operation member used for the battery connector according to a first embodiment of the present invention, FIG. 4A being a perspective view, FIG. 4B being a side view and FIG. 4C being a back view.
Figure 4B:
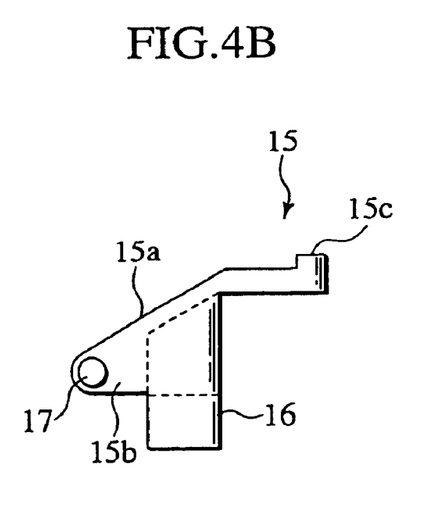
Figure 4C:
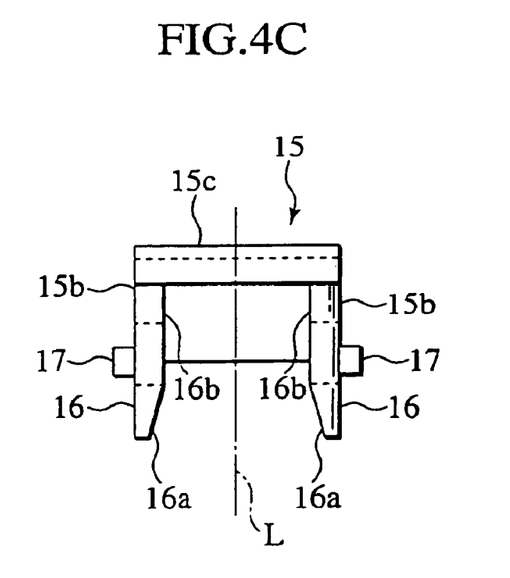

As shown in FIGS. 4A, 4B and 4C, pressing walls (pressing portions) 16, 16 are respectively provided on the left and right side plates 15b, 15b of the operation member 15. The pressing walls 16, 16 press the fitting portion 5a from its outside and reduce the aperture of the fitting portion 5a while the operation member 15 is being pivoted from the initial position (shown in FIGS. 5A, 6A and 7A) to the fastening position (shown in FIGS. 5B, 6B and 7B). The left and right pressing walls 16, 16 are arranged in parallel to each other and opposed to each other. Also, inclining portions 16a, 16a are respectively provided on lower sides of opposing faces (inner faces) of the pressing walls 16, 16, and parallel portions 16b, 16b are respectively provided on upper sides of the opposing faces (inner faces).

The inclining portion 16a is inclined with respect to a pivoting face L (refer to FIG. 4C) of the operation member 15, the parallel portion 16b is parallel with respect to the pivoting face L of the operation member 15. The inclination of the inclining portion 16a is set such that a space between the left and right inclining portions 16a, 16a opposed to each other is gradually reduced as the inclining portion 16a moves upward with respect to the pressing walls 16. Also, the transition from the inclining portion 16a to the parallel portion 16b proceeds continuously without step.

Then, the inclining portions 16a, 16a gradually press the fitting portion 5a from its outside and reduce the aperture of the fitting portion 5a as the operation member 15 is pivotably operated from the initial position towards the fastening position. Also, a returning force in a pivoting direction of the operation member 15 due to a reaction force occurring in an expanding direction of the aperture of the fitting portion 5a is cancelled in the fastening position where the operation member 15 has been pressed down. Therefore, the state where the aperture of the fitting portion 5a has been reduced is maintained by the parallel portions 16b, 16b.

Next, an operation of the embodiment will be explained.

As shown in FIG. 3, first, after the operation member 15 is attached to the terminal cover 10, the battery terminal 5 connected to the distal end of the wire W is inserted into the terminal cover 10 (incidentally, it is possible to attach the operation member 15 to the terminal cover 10 after the battery terminal 5 is inserted into the terminal cover 10).

At this time, the battery terminal 5 is inserted into the terminal cover 10 such that the inlet 5e of the fitting portion 5a in the battery terminal 5 faces the opening portion 12 provided in the left side wall 11c of the terminal cover 10. With the above-described constitution, the battery terminal 5 is concealed in the terminal cover 10 made of insulator and the battery connector C1 is formed.

Next, this battery connector C1 is fitted to the battery post 2. At this time, the terminal cover 10 is inserted into a space between the bottom face of the recessed portion 1a and the upper wall 3 of the battery 1, and the battery post 2 is accommodated in the terminal cover 10 through the opening portion 12. Thereby, as shown in FIG. 7A, the fitting portion 5a is loosely fitted to the battery post 2. As shown in FIG. 5A, FIG. 6A and FIG. 7A, when the operation member 15 is positioned at this initial position, the operation member 15 hardly press the fitting portion 5a from its outside. Therefore, the fitting portion 5a is loosely fitted to the battery post 2.

Next, as shown in FIG. 5A and FIG. 6A, the operation protrusion portion 15c is pressed down. Then, the inclining portions 16a, 16a come in contact with an outer peripheral face of the fitting portion 5a and press the fitting portion 5a so as to forcibly reduce the aperture of the fitting portion 5a by a wedge action, as the operation member 15 is pivoted downward about the pins 17, 17 serving as fulcrum. Thereby, an inner peripheral face of the fitting portion 5a is pressure-fixed on an outer peripheral face of the battery post 2.

At this time, as shown in FIG. 6B, a curved portion (a portion opposed to the inlet 5e) of the fitting portion 5a is pressed to the battery post 2 as the operation member 15 is pivotably operated. Therefore, the inner peripheral face of the fitting portion 5a is pressure-fixed to the outer peripheral face of the battery post 2 without any play. As a result, reliability of electric connection is enhanced.

Then, when the operation member 15 is pressed down to the fastening position, as shown in FIG. 7B, the parallel portions 16b, 16b press the outer peripheral face of the fitting portion 5a, instead of the inclining portions 16a, 16a. Therefore, since the fitting portion 5a is sandwiched between the left and right parallel portions 16b, 16b, the state where the aperture of the fitting portion 5a has been reduced is maintained stably by the left and right parallel portions 16b, 16b. That is, even when an elastic reaction force acting in an expanding direction of the aperture of the fitting portion 5a acts on the parallel portions 16b, 16b, a component force in a rotation direction of the operation member 15 is not generated. Accordingly, once the operation member 15 has been pressed down to the fastening position where the operation member 15 has been pressed down, the operation member 15 can naturally be maintained at the fastening position, without using locking means to lock the operation member 15 at the fastening position. Thereby, simplification of the constitution can be achieved.

In case that the battery connector C1 is detached from a state where the battery connector C1 has been attached to the battery post 2, this detachment can be performed by simply lifting up the rear end (operation protrusion portion 15c) of the operation member 15. The elastic reaction force of the fitting portion 5a which acts so as to restore its original state expands the reduced aperture of the fitting portion 5a by lifting the pressing walls 16, 16 which has been pressing the fitting portion 5a. Therefore, since the fitting portion 5a restores its original state where the aperture has not been reduced, the battery connector C1 can easily be detached from the battery post 2.

In case of the battery connector C1, since the battery terminal 5 is accommodated in the terminal cover 10, an exposure portion of a metal is concealed in the terminal cover 10 except for a portion of the metal which is required to be exposed. Therefore, there is not any risk that an operator receives an electric shock when the operator attaches/detaches the battery post 2 to/from the battery connector. Therefore, an improvement in safety is realized. Also, since the operation member 15 is pivotally attached to the terminal cover 10 via the pin 17, 17, there is no possibility that the operation member 15 may fall off. Additionally, it is possible to pressure-fix the fitting portion 5a to the battery post 2 easily and release the pressure-fixing by only pivoting the operation member 15 (pressing the member down and lifting it up in this embodiment).

Next, a battery connector C2 according to a second embodiment of the present invention will be explained.

Figure 8:
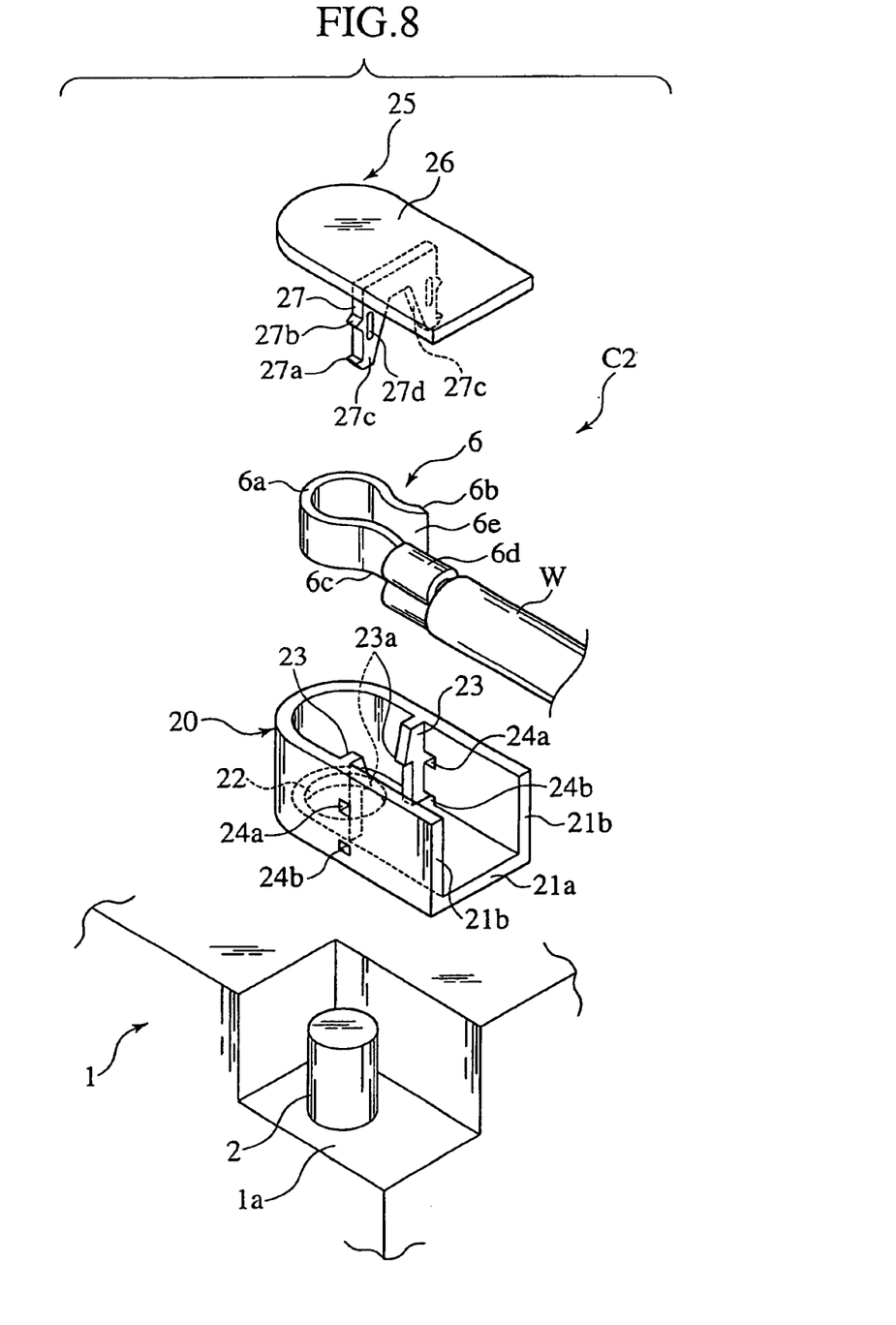
FIG. 8 is an exploded perspective view according to a second embodiment of the present invention.
Figure 9A:
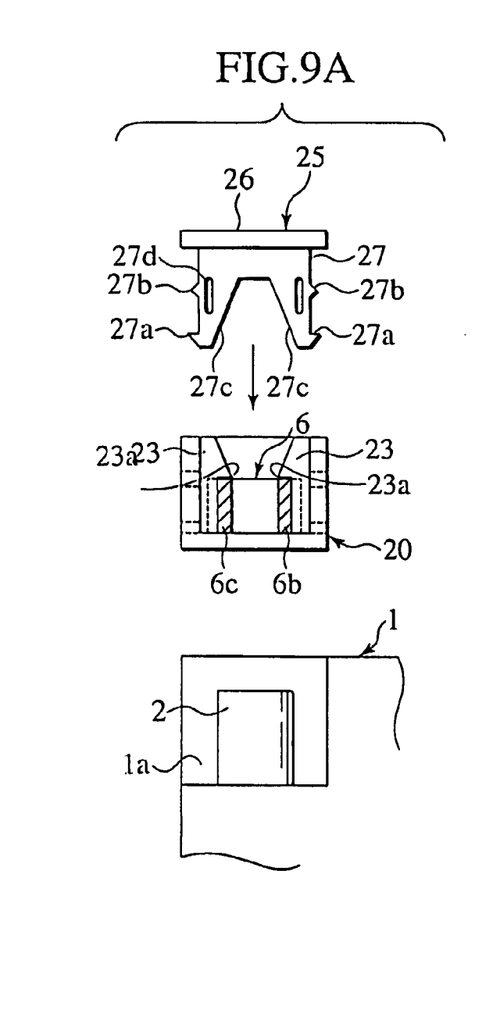
FIG. 9A, 9B and 9C are sectional views showing an assembling step of a battery connector according to the second embodiment of the present invention and a connecting step for connecting the battery connector to a battery post, as viewed from the rear side, FIG. 9A being a view showing a state prior to attaching an operation member to a terminal cover, FIG. 9B being as view showing a state where the operation member has temporarily been engaged with the terminal cover, and FIG. 9C being a view showing a state where the battery connector has regularly been engaged with the battery terminal by sliding the operation member into the terminal cover after setting the battery connector to the battery terminal.
Figure 9B:
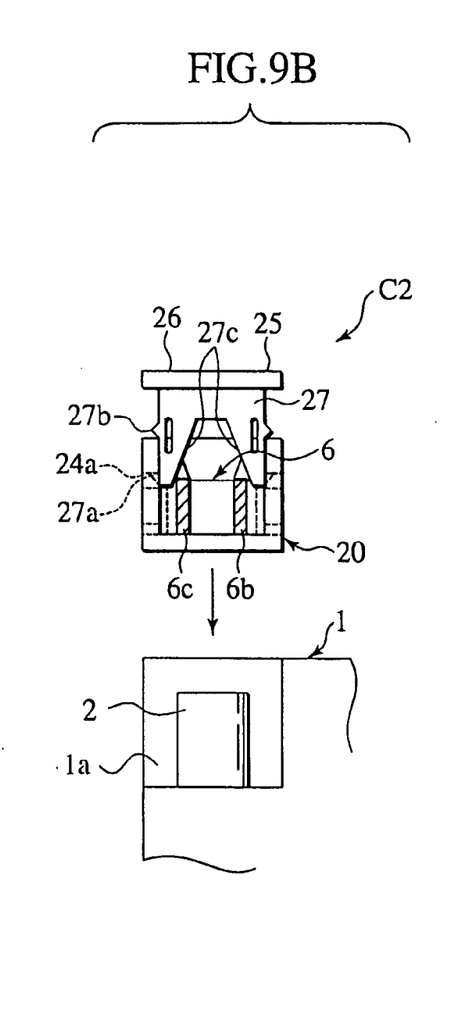
Figure 9C:
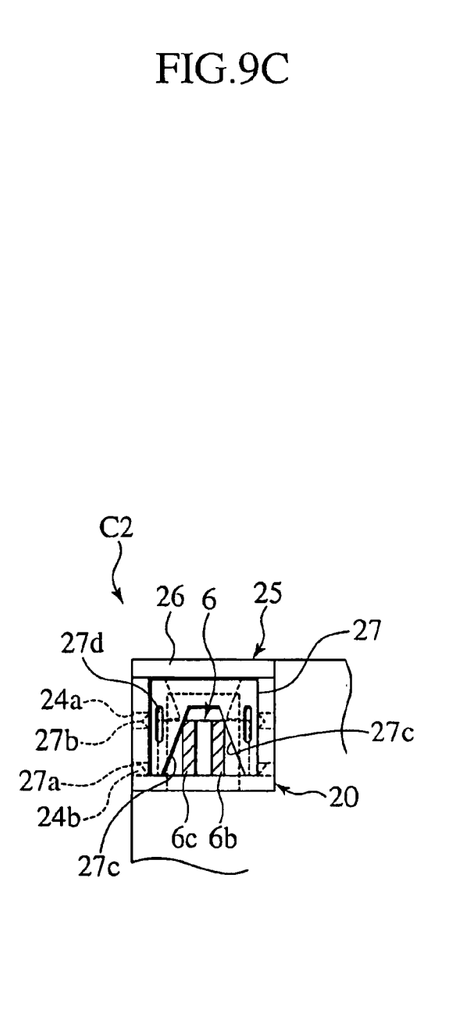
Figure 10:
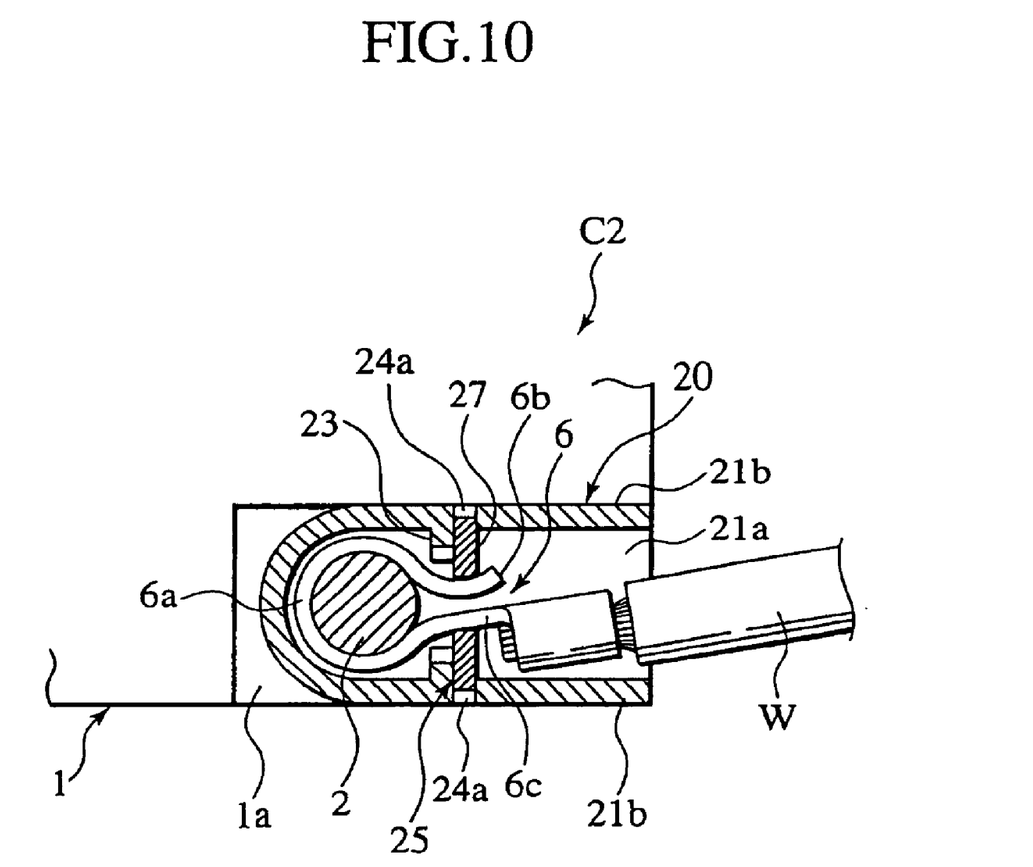
FIG. 10 is a horizontal sectional view showing a state where the battery connector according to the second embodiment of the present invention has been connected to a battery post.

FIG. 8 to FIG. 10 are explanatory views of the battery connector C2 according to the second embodiment. FIG. 8 is an exploded perspective view of the battery connector C2. FIG. 9A, FIG. 9B and FIG. 9C are sectional views showings steps of assembling the battery connector C2 and attaching the battery connector C2 to a battery post 2, as viewed from a direction of a wire (a rear direction). FIG. 10 is a horizontal sectional view showing a state where the battery connector C2 has been connected to the battery post 2.

As shown in FIG. 8, the battery connector C2 according to the second embodiment is connected at a distal end of a wire W. The battery connector C2 includes a battery terminal 6, a fitting portion 6a, a terminal cover 20, an opening portion 22 and an operation member 25. The battery terminal 6, which is made of metal, includes the fitting portion 6a which has an aperture enough to be loosely fitted to the battery post 2 and which is pressure-fixed on an outer peripheral face of the battery post 2 by reducing the aperture of the fitting portion 6a. The terminal cover 20, which is made of insulation resin and whose upper face is opened, accommodates the battery terminal 6 and has an opening portion 22 for the battery terminal 6 to fit to the battery post 2 therethrough. The operation member 25, which is made of insulation resin, is a lid body which closes the upper opening of the terminal cover 20, and it can be slid into the terminal cover 20 in upward and downward directions. Also, in a state where the fitting portion 6a has been loosely fitted to the battery post 2, the aperture of the fitting portion 6a can be reduced by sliding the operation member 25 from an initial position to a fastening position. Thereby, the battery connector C2 is pressure-fixed on the battery post 2.

Next, the constitutions of respective elements or members will be explained in detail. First, the constitution of the battery terminal 6 will be explained with reference to FIG. 8. The fitting portion 6a is formed in the battery terminal 6 by bending a metal strip plate in a U shape. Also, a circular space for accommodating the battery post 2 is formed in the battery terminal 6 by necking a distal end 6b and a proximal end 6c of the U-shaped fitting portion 6a inward. Further, a wire caulking portion 6d is provided at the proximal end 6c side so as to extend in a strip plate shape. The battery terminal 6 is connected to a distal end of a wire W by caulking the wire caulking portion 6d on the distal end of the wire W.

Next, the constitution of the terminal cover 20 will be explained with reference to FIG. 8. The terminal cover 20 takes a trough shape whose upper face is opened and which has a bottom wall 21a, and left and right side walls 21b, 21b. The left and right side walls 21b, 21b are continuously connected to each other by curving the terminal cover 20 in an R shape. Also, the terminal cover 20 has a structure that the battery terminal 6 which has been connected to a distal end of a wire W can be inserted into the terminal cover 20 from the upper opening of the terminal cover 20. Here, for fitting the fitting portion 6a to the battery post 2 after the battery terminal 6 has been accommodated in the terminal cover 20, a circular opening portion 22 is provided at a portion of the bottom wall 21a facing the circular space of the fitting portion 6a.

Also, a pair of terminal engagement walls 23, 23 are provided in a projecting manner on an inner wall of the left and right side walls 21b, 21b positioned on a proximal end side (wire insertion side) with respect to the circular opening portion 22. A predetermined space is provided between the left and right terminal engagement walls 23, 23. Engagement protrusions 23a, 23a, which are stopped by connecting them to an upper edge of the battery terminal 6, are respectively provided on inner side edges of the left and right terminal engagement walls 23, 23 opposed to each other at a predetermined height position from the bottom wall 21a (position corresponding to the height of the battery terminal). When a necked portion between the distal end 6b and the proximal end 6c of the fitting portion 6a is inserted between the left and right terminal engagement walls 23, 23, the battery terminal 6 can be prevented from coming off upward or chattering by connecting the engagement protrusions 23a, 23a to the upper edges of the battery terminal 6.

Incidentally, when the necked portion between the distal end 6b and the proximal end 6c of the fitting portion 6a is inserted between the left and right terminal engagement walls 23, 23, the necked portion is slightly pressed by the left and right terminal engagement walls 23, 23. However, the space between the left and right terminal engagement walls 23, 23 is set such that the aperture of the fitting portion 6a is not reduced largely (such that the fitting portion 6a is loosely fitted to the battery post 2).

Also, the operation member 25, which also serves as a lid body for the upper opening of the terminal cover 20, has a top plate 26 taking a shape corresponding to the upper opening of the terminal cover 20, and a pressing wall (pressing portion) 27 provided so as to be protruded from a back face of the tap plate 26. The pressing wall 27 protruding from the back face of the tap plate 26 is formed in a gate shape and it is provided so as to be slid in a space defined on a rear side of the terminal engagement walls 23. Inner side edges 27c, 27c of the pressing wall 27 are inclined such that a distance between the inner side edges 27c, 27c is gradually narrowed upwardly. The necked portion between the distal end 6b and the proximal end 6c of the fitting portion 6a, sandwiched between the terminal engagement walls 23, 23, are fastened from its outside by sliding the pressing wall 27 from an upper initial position (shown in FIG. 9B) to a lower fastening position (shown in FIG. 9C), so that the aperture of the fitting portion 6a is reduced. Therefore, the battery connector C2 is pressure-fixed on an outer peripheral face of the battery post 2.

Also, as shown in FIG. 8, engagement holes 24a, 24b and engagement protrusions 27a, 27b are respectively provided on inner side edges of the side walls 21b and on outer side edges of the pressing wall 27. These serve as temporary engagement means which engages the operation member 25 with the terminal cover 20 at the initial position, and a regular engagement means which regularly engages the operation member 25 with the terminal cover 20 at the fastening position. The engagement holes 24a, 24b in the terminal cover 20 are provided in two-stage manner so as to be spaced from each other vertically. Also, the engagement protrusions 27b, 27a in the operation member 25 are provided in a two-stage manner so as to be spaced from each other vertically.

As shown in FIG. 9B, when the operation member 25 is positioned at the initial position, the lower side of the engagement protrusions 27a, 27a are respectively fitted in the upper side of the engagement holes 24a, 24a so that a temporary engagement state can be achieved. Also, as shown in FIG. 9C, when the operation member 25 is positioned at the fastening position, the lower side of the engagement protrusions 27a, 27a are respectively fitted into the lower side of the engagement holes 24b, 24b and the upper side of the engagement protrusions 27b, 27b are respectively fitted into the upper side of the engagement holes 24a, 24a so that a regular engagement state is achieved.

That is, in the regular engagement state, since the operation member 25 is engaged with the terminal cover 20 at the upper stage and the lower stage, the operation member 25 can be firmly fixed to the terminal cover 20. Also, when the operation member 25 is positioned at the regular engagement position, the top plate 26 of the operation member 25 completely closes the upper opening of the terminal cover 20. Incidentally, a lightening portion 27d is provided in portion of the pressing wall 27 inside the upper side of the engagement protrusion 27b such that portion with where the engagement protrusion 27b has been provided are made flexible.

Next, operations of respective elements will be explained in detail.

As shown in FIG. 8, first, the battery terminal 6 is connected to the distal end of the wire W and the battery terminal 6 is inserted into the interior of the terminal cover 20 from the above prior to attaching the operation member 25 to the terminal cover 20. At this time, as shown in FIG. 9A, the necked portion between the distal end 6b and the proximal end 6c of the fitting portion 6a is inserted between the left and right terminal engagement walls 23, 23 from the above, and this necked portion is pressed down until the upper edge of the battery terminal 6 touches the lower side of the engagement protrusions 23a, 23a. Therefore, the battery terminal 6 is engaged with the battery cover 20 so as not to come off by engagement protrusions 23a, 23a.

In this state, the operation member 25 is covered on the upper opening of the terminal cover 20. Then, the pressing wall 27 protruding from the back face of the operation member 25 is inserted into the terminal cover 20 as the pressing wall 27 is slid into the space defined behind the terminal engagement walls 23. In this course of the insertion, as shown in FIG. 9A, the lower side of the engagement protrusions 27a, 27a are engaged with the upper side of the engagement holes 24a, 24a, respectively. Thereby, the battery connector C2 where the operation member 25 is temporarily engaged with the terminal cover 20 at the initial position can be obtained. At this time, the battery terminal 6 has the state where the aperture of the fitting portion 6a has hardly been reduced. In this state, next step for attaching the battery connector C2 to a battery 1 is started.

The battery connector C2 is attached to the battery post 2 from above the battery post 2. At this time, the battery post 2 is accommodated in the terminal cover 20 via the circular opening portion 22 provided in the bottom wall 21a of the terminal cover 20, and the fitting portion 6a accommodated in the terminal cover 20 is loosely fitted to the battery post 2.

Next, the operation member 25 which also serves as the lid body is pressed down in the state where the fitting portion 6a has been loosely fitted on the battery post 2. In this step, as shown in FIG. 9C, since the inclining inner side edges 27c, 27c of the gate-shaped pressing wall 27 are respectively pressure-fixed to the distal end 6b and the proximal end 6c of the fitting portion 6a, a fastening force is generated in a direction in which the space between the distal end 6b and the proximal end 6c is narrowed. Thereby, the aperture of the fitting portion 6a is reduced and the inner peripheral face of the fitting portion 6a is pressure-fixed to the outer peripheral face of the battery post.

Furthermore, when the operation member 25 is pressed down to the fastening position, the upper and lower engagement protrusions 27b, 27a provided on the operation member 25 are respectively fitted into the upper and lower engagement holes 24a, 24b provided in the terminal cover 20. Thereby, the operation member 25 is regularly engaged with the terminal cover 20. In the regularly engaged state, the top plate 26 of the operation member 25 completely closes the upper opening of the terminal cover 20.

In case of this battery connector C2, since the battery terminal 6 is accommodated in the terminal cover 20, an exposure portion of a metal is concealed in the terminal cover 10 except for a portion of the metal which is required to be exposed. Therefore, there is not any risk that an operator receives an electric shock when the operator attaches/detaches the battery post 2 to/from the battery connector C2. As a result, an improvement in safety is realized. Also, since the operation member 25 is attached to the terminal cover 20 so as to be slid into the terminal cover 20, the fitting portion 6a can easily be pressure-fixed to the battery post 2. Also, since the temporary engagement means and the regular engagement means are used, there is no possibility that the operation member 25 comes off and the state where the fitting portion 6a is fastened to the battery post 2 can securely be maintained.

What is claimed is:

1. A battery connector for connecting a wire to a battery post, comprising:
   a battery terminal having a fitting portion which has an aperture enough to be loosely fitted to the battery post and which is pressure-fixed to the battery post by reducing the aperture;
   a terminal cover receiving the battery terminal therein and having an opening portion for the battery terminal to fit to the battery post therethrough; and
   an operation member attached to the terminal cover and fastening the battery terminal to the battery post by reducing the aperture of the fitting portion loosely fitted to the battery post;
   wherein the operation member comprises a pressing portion configured to reduce the aperture of the fitting portion by applying a force to the battery terminal at opposing sides of the battery post as the operation member is operated.

2. A battery connector according to claim 1, wherein the terminal cover and the operation member are made of insulation resin.

3. A battery connector according to claim 1, wherein the operation member is pivotably attached to the terminal cover and the pressing portion reduces the aperture of the fitting portion as the operation member is pivotably operated.

4. A battery connector for connecting a wire to a battery post, comprising:
   a battery terminal having a fitting portion which has an aperture enough to be loosely fitted to the battery post and which is pressure-fixed to the battery post by reducing the aperture;
   a terminal cover receiving the battery terminal therein and having an opening portion for the battery terminal to fit to the battery post therethrough; and
   an operation member attached to the terminal cover and fastening the battery terminal to the battery post by reducing the aperture of the fitting portion loosely fitted to the battery post;
   wherein the operation member is pivotably attached to the terminal cover and has a pressing portion which reduces the aperture of the fitting portion as the operation member is pivotably operated, and
   wherein the pressing portion comprises
   an inclining portion which is inclined with respect to a pivoting face of the operation member and which gradually reduces the aperture of the fitting portion as the operation member is pivotably operated in a first half of a pivoting operation; and
   a parallel portion which is contiguous to the inclining portion and is arranged in parallel with respect to the pivoting face of the operation member and which stably maintains the reduced aperture of the fitting portion as the operation member is pivotably operated in a second half of the pivoting operation.

5. A battery connector according to claim 4, wherein the terminal cover and the operation member are made of insulation resin.

6. A battery connector for connecting a wire to a battery post, comprising:
   a battery terminal having a fitting portion which has an aperture enough to be loosely fitted to the battery post and which is pressure-fixed to the battery post by reducing the aperture;
   a terminal cover receiving the battery terminal therein and having an opening portion for the battery terminal to fit to the battery post therethrough; and
   an operation member attached to the terminal cover and fastening the battery terminal to the battery post by reducing the aperture of the fitting portion loosely fitted to the battery post;
   wherein the operation member is slidably attached to the terminal cover and has a pressing portion to reduce the aperture as the operation member is slidably operated;
   wherein the pressing portion comprises an upper protrusion and a lower protrusion, and the terminal cover comprises an upper hole and a lower hole capable of engaging at least one of the upper and lower protrusions.

7. A battery connector according to claim 6, wherein the lower protrusion is fitted into the upper hole to temporarily engage the operation member with the terminal cover in a first half of a sliding operation, and the lower protrusion and the upper protrusion are fitted into the lower hole and the upper hole respectively to regularly engage the operation member with the terminal cover in a second half of the sliding operation.

8. A battery connector according to claim 6, wherein the operation member serves as a lid body for terminal cover and completely closes an upper opening of the terminal cover in a state where the operation member has been engaged with the terminal cover.

* * * * *